March 3, 1970 W. P. VICARY 3,498,579
VEHICLE MIRROR
Filed Jan. 8, 1968 2 Sheets-Sheet 1
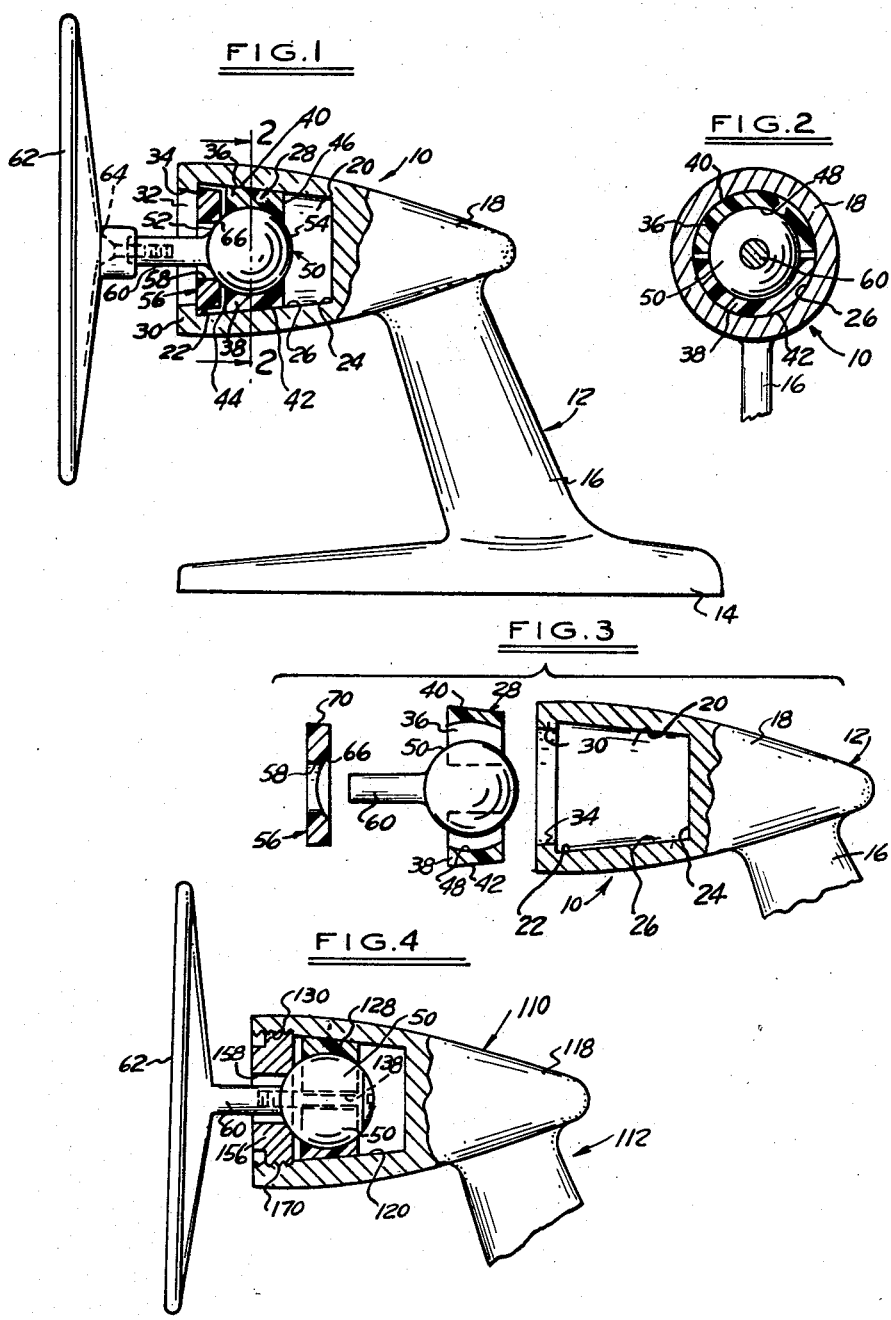
INVENTOR
WILLIAM P. VICARY
BY
ATTORNEYS March 3, 1970 W. P. VICARY 3,498,579
VEHICLE MIRROR
Filed Jan. 8, 1968 2 Sheets-Sheet 2
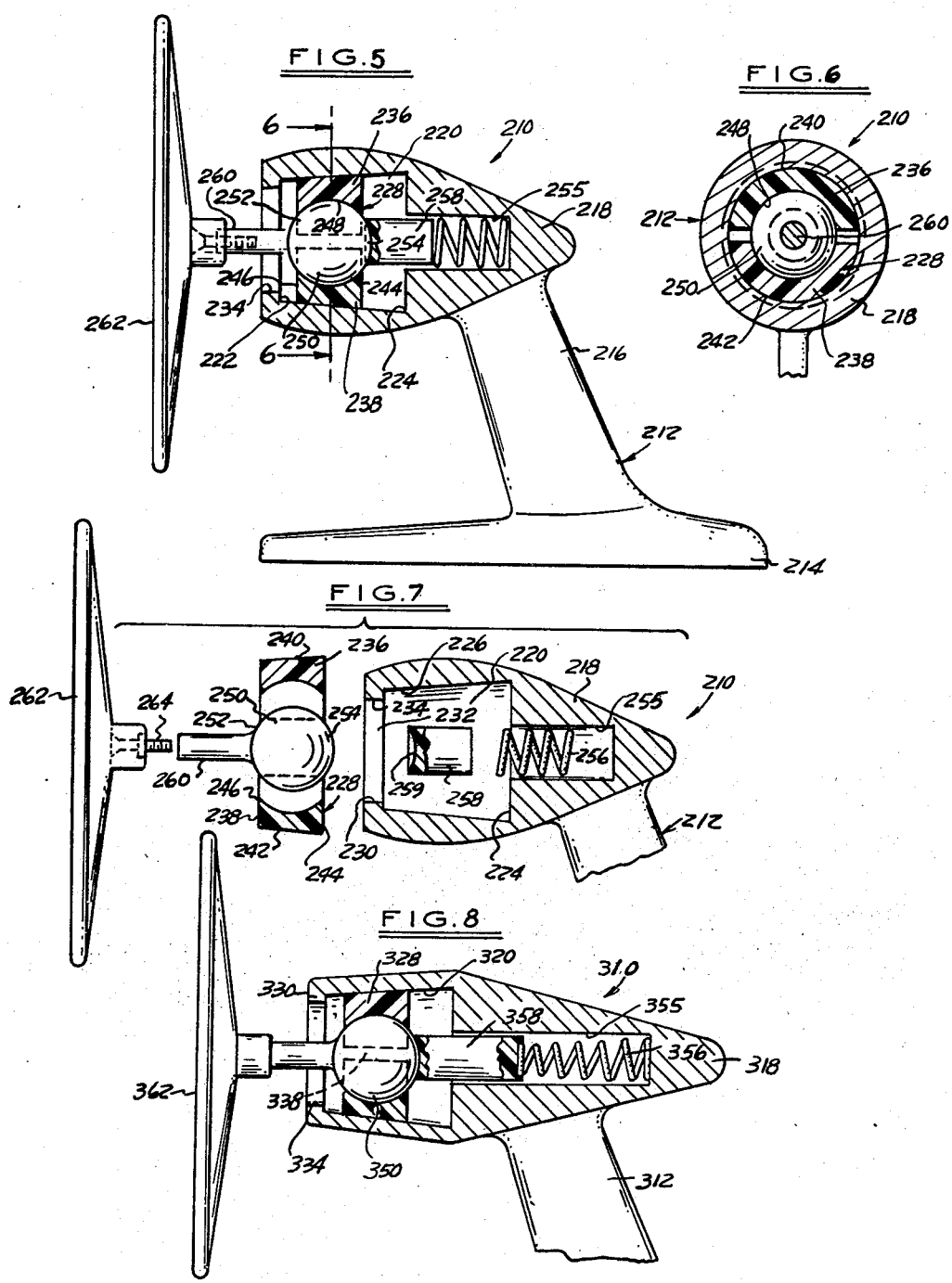
INVENTOR
WILLIAM P. VICARY
ATTORNEYS United States Patent Office 3,498,579
Patented Mar. 3, 1970

3,498,579
VEHICLE MIRROR
William P. Vicary, St. Clair Shores, Mich., assignor to Jim Robbins, Seat Belt Co., Royal Oak, Mich., a corporation of Delaware
Filed Jan. 8, 1968, Ser. No. 696,471
Int. Cl. A47g 1/24; B60r 1/06
U.S. Cl. 248—483          7 Claims

ABSTRACT OF THE DISCLOSURE

A mirror of the type to be mounted on the exterior side of a vehicle and including a mounting member having a tapered recess for receiving a bearing assembly. The bearing assembly has a spherical surface for receiving a ball member of the mirror and in one embodiment a locking element snaps into the recess to urge the bearing assembly into wedging engagement with the tapered surface of the recess to thereby retain the mirror in an adjusted position. In another embodiment a spring member is provided to urge the bearing assembly toward the reduced diameter portion of the tapered recess.

BACKGROUND OF THE INVENTION

Exterior rear view mirrors have long been used for automobiles and other vehicles. The problem encountered in the design of such mirrors has been to provide an assembly capable of being adjusted through a wide range of positions and yet which will remain locked in the adjusted position. Such assemblies have been heretofore provided but have been difficult and relatively expensive to manufacture and assemble.

SUMMARY OF THE PRESENT INVENTION

The present invention provides a mirror assembly which includes a mounting member having a tapered recess for receiving a bearing assembly. The bearing assembly cooperates with the ball member formed as a part of the mirror element to produce the necessary range of adjustment and means are provided to urge the bearing assembly along the tapered recess and toward the reduced diameter section thereof to tighten the bearing assembly about the ball member and to thereby retain the mirror in its adjusted position.

This construction provides the necessary range of adjustment and secure retention of the mirror in the desired position with a minimum number of readily assembled parts so that the assembly is easily manufactured and produced.

DESCRIPTION OF THE DRAWINGS

A clearer understanding of the present invention will be readily apparent from the following description of several preferred embodiments thereof. The description makes reference to the accompanying drawings in which like reference characters refer to like parts throughout the several views and in which:

FIG. 1 is a side elevational view of one embodiment of the present invention with parts broken away and shown in cross section for purposes of illustration, FIG. 2 is a cross-sectional view taken substantially along line 2—2 of FIG. 1, FIG. 3 is an exploded view illustrating the mirror mounting components prior to assembly, FIG. 4 is a view similar to FIG. 1 but illustrating another preferred embodiment of the present invention, FIG. 5 is a view similar to FIG. 1 but illustrating still another preferred embodiment of the present invention, FIG. 6 is a view taken substantially on line 6—6 of FIG. 5, FIG. 7 is an exploded view illustrating the mirror mounting components of the embodiment of FIG. 5 prior to assembly, and FIG. 8 is a view similar to FIG. 1 but illustrating yet another preferred embodiment of the present invention.

DESCRIPTION OF SEVERAL PREFERRED EMBODIMENTS

One preferred mirror assembly 10 of the present invention is illustrated in FIGS. 1–3 as comprising a mounting member 12 having a base portion 14 for mounting the assembly 10 to a vehicle in the conventional manner and a post 16 extending outwardly from the base portion 14 to position the housing structure 18 away from the vehicle.

The housing structure 18 is provided with a tapered recess 20 defined by a surface 26 and opening to one end through a mouth portion 22 and gradually reducing in diameter to an interior termination portion 24 spaced inwardly from the opposite end of the recess 20. An annular lip 30 is provided adjacent the mouth portion 22 of the recess 20. The lip 30 defines an opening 32 which preferably has a tapered inner surface 34.

A substantially annular bearing assembly 28 is preferably constructed of a plastic or similar material having a sufficient resiliency to permit it to be compressed sufficiently to be inserted past the lip 30 into the tapered recess 20. The bearing assembly 28, as can best be seen in FIG. 2, preferably comprises a pair of elements 36 and 38 which in section are substantially semi-circular and which are provided with exterior surfaces 40 and 42 respectively tapered to match the taper of the recess 20. As can best be seen in FIG. 1, the diameter of the bearing assembly 28 at its largest end 44 is preferably less than the diameter of the mouth portion 22 and the diameter of the bearing assembly 28 at its smallest end 46 is greater than the diameter of the recess 20 at the termination portion 24. Therefore the tapered bearing assembly 28 when inserted into the tapered recess 20 will wedgingly engage the surface of the recess 20 in an area intermediate the mouth portion 22 and the portion 24.

The bearing assembly 28 is also provided with a central spherical recess defining a bearing surface 48 to swivelly seat a ball element 50. The ball element 50 is received in the bearing assembly 28 and the bearing surface 48 prevents the ball element 50 from moving in either direction with respect to the bearing assembly 28 while permitting it to swivel in the manner of a conventional ball joint.

An annular locking element 56 is received in the recess 20 intermediate the bearing assembly 28 and the lip 30 preferably in abutment with the outer edge of the ball element 50 as can best be seen in FIG. 1. To permit the locking element 56 to be compressed sufficiently to be inserted past the lip 30 it is necessary that the element 56 be constructed of a resilient material preferably plastic and to aid in this compression the exterior surface 70 of the locking element 56 is preferably tapered. A stem 60 is mounted to the ball element 50 and to permit the stem 60 to extend outwardly from the recess 20 the locking element 56 is provided with a central through opening 58 as can best be seen in FIGS. 1 and 3. A mirror element 62 is mounted to the exterior end of the stem 60 by any convenient means such as the screw 64 shown in dashed lines in FIG. 1. As can best be seen in FIG. 3 the locking element 54 is preferably provided with a spherical bearing surface 66 to receive the surface of the ball element 50.

Referring to FIG. 3 the mirror assembly 10 is preferably assembled by first inserting the bearing elements 36 and 38 past the lip 30 into the enlarged portion in the recess 20. The ball element 50 is then inserted into the recess 20 and between the bearing elements 36 and 38. The locking element 56 is then forced past the lip 30 and the thickness of the element 56 is sufficient to cause abutment thereof with the ball element 50 and to urge the ball element 50 and the bearing elements 36 and 38 towards the reduced diameter end of the recess 20 to produce the wedging action causing the bearing assembly 28 to firmly grasp the ball element 50. The small gaps provided between the ends of the members 36 and 38 as can best be seen in FIG. 2 insures firm contact between the bearing assembly 28 and the ball element 50. The wedging action and the resulting engagement between the bearing assembly 28 and the ball element 50 produce sufficient frictional drag to prevent inadvertent movement of the mirror element 62 as the result of forces applied thereagainst such as wind pressure or vehicle vibration. The mirror element 62, however, may be hand adjusted to the desired position by moving it to produce a swivelling between the ball element 50 and the bearing assembly 28. The range of adjustment of the mirror element 62 is determined by the diameter of the opening 58 in the locking element 56 and the size of this opening may be increased or decreased as required to provide a suitable range of adjustment for the mirror element 62.

The tapering of the surface 34 of the opening 32 towards the recess 20 is of importance in assembling the mirror assembly 10 of the present invention. The tapered outer surface 70 of the locking element 56 has a larger diameter which is preferably only slightly greater than the smallest diameter of the opening 32. Consequently, when the locking element 56 is inserted into the opening 32, the forward portion thereof is first received without engaging or contacting the lip 30. Further movement of the locking element 56 causes engagement of the outer surface 70 of the locking element 56 with the surface 34 resulting in an even pressure being applied around the locking element 56 to cause deformation sufficient to permit the entire insertion of the locking element 56 into the recess 20. The same camming action is utilized for insertion of the bearing assembly 28 past the lip 30 and into the tapered recess 20.

Another preferred mirror assembly 110 of the present invention is illustrated in FIG. 4 and is substantially similar to the embodiment shown in FIGS. 1–3 and includes a mounting member 112 having a housing portion 118. The housing portion 118 is similar to the housing portion 18 described above and includes a tapered recess 120 adapted to receive a bearing structure 128 which firmly engages the ball element 50 to swivelly mount the mirror element 62 all as described above. The bearing structure 128 unlike the bearing assembly 28 described above is preferably of the split ring type rather than of a two-piece construction and therefore has a portion of the bearing wall removed to form a gap 138. Thus, the bearing element 128 can be compressed to be inserted into the recess 120 and will expand sufficiently to receive the ball element 50 all as described above.

A locking element 156 is provided to engage the ball element 50 and to thereby urge the ball element 50 and bearing structure 128 inwardly to produce a camming action as described above to lock the assembly in the desired adjusted position. Unlike the locking element 56, however, the element 156 of this preferred embodiment is formed with an externally threaded portion 170 to be received in an internally threaded portion 130 formed at the entrance to the recess 120. Threading the locking element 156 into the threaded portion 130 then causes the ball element 50 to be moved inwardly causing the desired wedging of the bearing structure 128 and seating of the ball element 50 all as described above.

FIGS. 5, 6 and 7 illustrate yet another preferred mirror assembly 210 of the present invention as comprising a mounting member 212 having a base portion 214 and a post 216 for positioning a housing structure 218 outwardly from the vehicle to which the mirror assembly 210 is mounted.

The housing structure 218 is provided with a tapered recess 220 but unlike the embodiments described above the tapered recess 220 has a smaller diameter at the mouth portion 222 than in the interior termination portion 224 so that the surface 226 defining the tapered recess 220 uniformly increases in diameter from the mouth portion 222 to the termination portion 224. An annular lip 230 is provided adjacent the mouth portion 222 of the recess 220 and a tapered surface 234 at the edge of the lip 230 defines an opening 232.

An annular bearing assembly 228 is received in the recess 220 and preferably comprises a pair of elements 236 and 238 which are substantially semi-circular in section as can best be seen in FIG. 6. The exterior surfaces 240 and 242 of the elements 236 and 238, respectively, are tapered to match the recess 220. It will be noted that the diameter of the bearing assembly 228 at its larger end 244 is preferably less than the diameter of the recess 220 in the termination portion 224 and the diameter of the bearing assembly 228 at its smallest end 246, when in the expanded position shown is preferably greater than the diameter of the mouth portion 222. Therefore the tapered bearing assembly 228 when inserted into the tapered recess 220 will wedgingly engage the surface 226 at a point intermediate the mouth portion 222 and the termination portion 224.

The bearing assembly 228 has a central opening therethrough which defines a bearing surface 248 in the form of a section of a sphere to swivelly seat a ball element 250. The ball element 250 is received in the bearing assembly 228 with portions 252 and 254 projecting outwardly from opposite sides of the bearing assembly 228. The diameter of the surface 248 in the bearing assembly 228 is substantially equal to the major diameter of the ball element 250 so that the ball element 250 is firmly seated in the bearing assembly 228 when the bearing assembly 228 is clamped about the ball element 250 and it cannot move in either direction with respect to the bearing assembly 228.

The housing structure 218 is provided with a small diameter recess 255 extending axially from the inward end of the tapered recess 220 and a coil spring 256 is carried within the recess 255 to urge a plunger 258 axially outwardly against the portion 254 of the ball element 250 to thereby urge the ball element 250 and the bearing assembly 228 toward the reduced diameter section of the tapered recess 220. This produces a camming or wedging effect which results in sufficient compression of the bearing assembly 228 about the ball element 250 to retain the ball element 250 in an adjusted position with respect to the bearing assembly 228 and the housing 218. As can best be seen in FIG. 7 the plunger 258 is preferably provided with a spherically recessed end portion 259 for engagement with the portion 254 of the ball element 250.

A mirror element 262 is mounted to the end of a stem 260 by any convenient means such as the screw 264 and the stem 260 is fixed to the ball element 250 so that swivelling of the ball element 250 produces a corresponding positioning of the mirror element 262.

The mirror assembly 210 of the preferred embodiment illustrated in FIGS. 5–7 is assembled in the manner illustrated in FIG. 7 by first inserting the spring 256 and the plunger 258 past the lip 230 and into the recess 254. The bearing elements 236 and 238 are then forced past the lip 230 into the tapered recess 220 and although the diameter of the bearing assembly 228 when expanded is larger than that of the opening 232 insertion is accomplished by reason of the two-piece construction of the bearing assembly 228, the material used, and because the ball element 250 is not in between the members 236–238 so that they can be contracted to permit insertion in the recess 220. The mirror element 262 is grasped to insert the ball element 250 into the recess 220 and into a position intermediate the bearing elements 236 and 238. This portion of the assembly is much easier than the assembly of the mirror illustrated above in that pushing the ball element 250 farther into the bearing assembly 228 tends to move the assembly 228 towards the larger end of the tapered recess 220 so that the ball element 250 can be readily disposed within the assembly 228.

In the process of inserting the ball element 250 into the recess 220 the plunger 258 is contacted and is moved into the recess 255 against the force of the spring 256. Upon release of the mirror element 262 the spring 256 biases the plunger 258 outwardly to urge the ball element 250, the bearing assembly 228 and the mirror element 262 to the left to produce a wedging action which compresses the bearing assembly 228 tightly around the outer surface of the ball element 250 to thereby lock the mirror element 262 in the particular position in which it has been set.

The embodiment illustrated in FIG. 8 is substantially similar to the embodiment illustrated in FIGS. 5-7 and comprises a mirror assembly 310 having a housing portion 318 positioned outwardly from the vehicle by a post 312. The housing portion 318 includes a tapered recess 320 formed in a manner similar to the manner of forming the recess 220 as described above and a bearing structure 328 is inserted in the recess 320 past an opening 334 formed by a lip 330 all as described above. The bearing structure 328 in cooperation with the tapered recess 320, a plunger 358, and a spring 356 carried in a recess 355 retains and positions a mirror element 362 substantially in the manner described above. The difference in construction between the embodiment of FIGS. 5-7 and the embodiment of FIG. 8 resides in the construction of the bearing structure 328 which like the bearing element 128 of FIG. 4 is of a split ring type construction rather than a two-piece construction and therefore has a portion of the bearing wall removed to form a gap 338 to permit to bearing structure 328 to be compressed sufficiently to pass the lip 330 and to move back into engaging position with respect to the tapered recess 320 to receive the ball element 350.

The bearing structures illustrated as well as the locking element of FIGS. 1-3 are preferably fabricated from a plastic material having sufficient flexibility and resiliency to permit deformation thereof to be inserted past the lip and into the tapered recess. While such materials are preferred because of the ease and low cost of production and the availability of these materials with a wide range of physical characteristics particularly the availability of plastics having characteristics suitable to provide a bearing surface of the desired friction values such elements could be constructed of other materials as well having these characteristics.

It is apparent that mirror assemblies have been described which meet the essential requirements of rear view vehicle mirrors. The mirror assemblies which have been described are of low cost construction are easily assembled from a minimum of parts and yet the particular construction provides an assembly which can be readily adjusted through a wide range of adjustments and once set in a desired position will stay in that position while being subjected to normal driving vibrations and forces.

It is also apparent that although I have described several embodiments of my invention many other changes aid modifications can be made therein without departing from the spirit of the invention as expressed by the appended claims.

I claim:

1. A mirror assembly comprising a housing, said housing having a blind tapered recess open at one end of said housing and closed at the other end thereof and provided with an enlarged diameter portion at the opening thereto and a reduced diameter portion remote from the opening thereto, a substantially annular bearing means sized to be receivable in said recess through said opening, said bearing means having a tapered exterior surface complementary to the tapered interior surface forming said recess and an interior curved bearing surface, a mirror element having a ball portion and a post connected therewith, said ball portion being sized to be insertable through said opening and receivable by said bearing surface of said bearing means to urge said bearing means radially outwardly to have said exterior surface engage with said interior surface forming said recess and means carried by said housing and sized to be receivable in said opening for engagement with said ball portion to urge said ball portion axially and said bearing means into said tapered recess to cam said bearing means into secure engagemetn about said ball portion to thereby retain said mirror element in the desired adjusted position with respect to said housing.

2. The assembly as defined in claim 1 and in which said bearing means is fabricated of a flexible, resilient material having at least one axial gap in the wall thereof to be radially expandable and contractable.

3. The assembly as defined in claim 1 and in which said bearing surface is configured in the shape of a section of a sphere, said bearing surface having a diameter substantially equal to the diameter of the ball portion, said ball portion having portions extending from each side of said bearing means whereby said ball portion is firmly retained within said bearing means upon wedging of the bearing means into said tapered recess.

4. The assembly as defined in claim 1 and in which said means carried by the housing is an externally threaded member, said recess being internally threaded in the area of the opening thereto and threadingly receiving said locking element.

5. The combination as defined in claim 1 and including a radially inwardly extending lip portion formed in said housing structure forming the opening to said recess, said means carried by the housing having an external diameter greater than the internal diameter of said lip portion and being deformable to pass therethrough into the recess for subsequent return to the original shape to thereby lockingly engage the interior surface of the lip and maintain the bearing means and the ball element in an assembled relationship.

6. A mirror assembly comprising a housing, said housing having a blind tapered recess open at one end of said housing and closed at the other end thereof and provided with a reduced diameter portion at the opening thereto and an enlarged diameter portion remote from the opening thereto, a substantially annular bearing means sized to be receivable in said recess through said opening, said bearing means having a tapered exterior surface complementary to the tapered interior surface forming said recess and an interior curved bearing surface, a mirror element having a ball portion and a post connected therewith, said opening being sufficiently large to permit insertion of said ball portion into said recess through said opening, said ball portion being receivable by said bearing surface of said bearing means to urge said bearing means radially outwardly to have said exterior surface engage with said interior surface forming said recess and biasing means carried in said recess and urging said ball portion axially and bearing means toward said opening of said tapered recess to cam said bearing means into secure engagement about said ball portion to thereby retain said mirror element in the desired adjusted position with respect to said housing.

7. The mirror assembly as defined in claim 6 and including a second recess formed in said housing structure of a smaller diameter than said tapered recess and extending from the closed end point of said tapered recess into said housing structure, said biasing means comprising a plunger slidably mounted in said second recess, a spring in said second recess and urging said plunger into engagement with a portion of the ball element projecting outwardly of said bearing means to thereby urge the ball element and the bearing means toward said opening.

References Cited

UNITED STATES PATENTS

| | | |
|---|---|---|
| 769,248 | 9/1904 | Brainard. |
| 1,918,394 | 7/1933 | Hufferd et al. |
| 1,971,184 | 8/1934 | Hufferd et al. |
| 1,973,847 | 9/1934 | Orlow et al. _____ 287—87 X |
| 2,063,504 | 12/1936 | Horwitt et al. _____ 287—12 X |
| 2,591,832 | 4/1952 | Kogstrom. |
| 3,073,634 | 1/1963 | Gottschald. |
| 3,409,317 | 11/1968 | Richards _____ 287—87 X |

FOREIGN PATENTS

| | | |
|---|---|---|
| 337,220 | 5/1921 | Germany. |
| 437,475 | 10/1935 | Great Britain. |
| 1,191,468 | 4/1959 | France. |

DAVID J. WILLIAMOWSKY, Primary Examiner

A. V. KUNDRAT, Assistant Examiner

U.S. Cl. X.R.

248—288, 481; 287—21, 87